(12) United States Patent
Rajkotia (10) Patent No.: US 9,459,682 B2
(45) Date of Patent: Oct. 4, 2016

(54) POWER MANAGEMENT OF DEVICES IN A NETWORK

(71) Applicant: QUALCOMM Incorporated, San Diego, CA (US)

(72) Inventor: Purva R. Rajkotia, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 13/686,410

(22) Filed: Nov. 27, 2012

(65) Prior Publication Data

US 2014/0149758 A1    May 29, 2014

(51) Int. Cl.

| | |
|---|---|
| G06F 1/32 | (2006.01) |
| H04L 12/12 | (2006.01) |
| H04L 12/28 | (2006.01) |
| H04L 12/64 | (2006.01) |

(52) U.S. Cl.
CPC ............ G06F 1/3234 (2013.01); H04L 12/12 (2013.01); H04L 12/283 (2013.01); H04L 12/2816 (2013.01); H04L 12/6418 (2013.01); Y02B 60/34 (2013.01)

(58) Field of Classification Search
CPC .... G06F 1/3287; G06F 1/329; G06F 1/3203; G06F 1/3209; G06F 1/3231
See application file for complete search history.

(56) References Cited

U.S. PATENT DOCUMENTS

| | | |
|---|---|---|
| 6,408,351 B1 | 6/2002 | Hamdi et al. |
| 7,539,508 B2 | 5/2009 | Bahl et al. |
| 8,170,624 B1 | 5/2012 | Huang et al. |
| 2002/0019215 A1* | 2/2002 | Romans .................... 455/69 |
| 2006/0209715 A1 | 9/2006 | Kushalnagar et al. |
| 2009/0161589 A1* | 6/2009 | Twitchell, Jr. ............. 370/311 |
| 2009/0275338 A1 | 11/2009 | Twitchell, Jr. |
| 2010/0020810 A1* | 1/2010 | Li ........................ H04L 12/12 370/400 |
| 2010/0099358 A1* | 4/2010 | Kumar et al. ............. 455/41.3 |
| 2010/0100716 A1* | 4/2010 | Scott .................... G06F 1/3209 713/1 |

(Continued)

FOREIGN PATENT DOCUMENTS

| | | |
|---|---|---|
| EP | 1557974 | 7/2005 |
| WO | 2014085164 | 6/2014 |

OTHER PUBLICATIONS

Carcelle, Xavier. Power Line Communications in Practice. Norwood, MA, USA: Artech House, 2009., p. 11-12, 121 Retrieved from: ProQuest ebrary. Web. Oct. 28, 2014.*
"PCT Application No. PCT/US2013/071049, International Search Report and Written Opinion of the ISA", Mar. 5, 2014 , 9 pages.

(Continued)

*Primary Examiner* — Jaweed A Abbaszadeh
*Assistant Examiner* — Cheri Harrington
(74) *Attorney, Agent, or Firm* — DeLizio Law, PLLC (57) ABSTRACT

A method includes receiving, at a first connectivity device, a first wake-up signal from an electronic device associated with a first class of devices. The first connectivity device is coupled to provide communications between the electronic device and a gateway device that provides access to an external network. The method includes determining a length of time that the first connectivity device is to remain in an active power mode based on a usage pattern defined for the first class of devices. The method includes updating the first connectivity device to be in the active power mode for at least the length of time.

29 Claims, 5 Drawing Sheets

(56) References Cited

U.S. PATENT DOCUMENTS

| | | | |
|---|---|---|---|
| 2012/0131369 A1 | 5/2012 | Paljug | |
| 2012/0271380 A1* | 10/2012 | Roberts | A61N 1/37252 607/60 |
| 2012/0320793 A1* | 12/2012 | Balbierer | H04L 12/12 370/254 |
| 2014/0098727 A1* | 4/2014 | Murabito et al. | 370/311 |
| 2014/0220886 A1* | 8/2014 | Adrangi | H04W 52/0229 455/41.1 |
| 2014/0372781 A1* | 12/2014 | Klappert | H04N 7/163 713/323 |

OTHER PUBLICATIONS

"PCT Application No. PCT/US2013/071049, Written Opinion of the IPEA", Nov. 5, 2014, 5 pages.

"PCT Application No. PCT/US2013/071049 International Preliminary Report on Patentability", Feb. 10, 2015, 8 pages.

* cited by examiner

POWER MANAGEMENT OF DEVICES IN A NETWORK

BACKGROUND

Embodiments of the inventive subject matter generally relate to the field of communication networks, and, more particularly, to power management of devices in a network.

The demand for high data rate in-home applications has been growing rapidly. An increasing number of electronic consumer devices (e.g., televisions, video playback devices, gaming devices, etc.) now have network connectivity for Internet communications. As standards are addressing higher bandwidth network communications to meet increasing demands, device power consumption is also increasing. Therefore, power consumption and management are becoming more important to the overall cost for network management.

SUMMARY

In some embodiments, a method includes receiving, at a first connectivity device, a first wake-up signal from an electronic device associated with a first class of devices. The first connectivity device is coupled to provide communications between the electronic device and a gateway device that provides access to an external network. The method includes determining a length of time that the first connectivity device is to remain in an active power mode based on a usage pattern defined for the first class of devices. The method includes updating the first connectivity device to be in the active power mode for at least the length of time.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to Powerline Communications (PLC), any other type of wired (e.g., Ethernet) or wireless communications (e.g., Wireless Local Area Network (WLAN)) can be used in some embodiments. In other instances, well-known instruction instances, protocols, structures and techniques have not been shown in detail in order not to obfuscate the description.

Various embodiments include power management of devices in a network based on connectivity of a device to other devices in the network and based on usage characteristics/usage patterns of these other devices. In other words, power management of a particular device can be affected by other devices that the particular device is connected to in a network. A home network can allow network communications for different types of electronic devices (e.g., televisions, video playback devices, gaming devices, routers, etc.). In some implementations, the electronic devices can be connected through a home gateway device for sending and receiving network communications to and from the Internet. The electronic devices can be connected (wired or wirelessly) through one or more connectivity devices (e.g., routers, other electronic devices, etc.) to the home gateway device. For example, a television can be connected to a video playback receiver that is connected to a wireless router. The wireless router may be further connected to the home gateway device. Accordingly, network communications from the Internet that are destined for the television can be transmitted through the home gateway device, through the wireless router and through the video playback receiver to the television. In this example, the connectivity devices for the electronic device include the home gateway device, the wireless router and the video playback device. This network configuration provides a cascade where the home gateway device is at the top of the cascade and network communications flow to the electronic devices through a series of one or more connectivity devices. Also, this network configuration can include multiple cascades that originate from the home gateway device to different electronic devices, where each electronic device can communicate with the home gateway device through a different series of one or more connectivity devices. A more detailed example of this network configuration is depicted in FIG. 1, which is described in more detail below.

Power management of the different devices (electronic device, connectivity device, and home gateway device) in the network can include switching between active power mode and reduced power mode. A reduced power mode of a device can be defined such that one or more components (e.g., units in a power subsystem) in the device remain operational to receive wake-up signals, while other components in the device (e.g., units in a main subsystem) are not operational (i.e., a sleep state) and/or receiving no power. As will be further described below, the wake-up signals can control when the device transitions to an active power mode. An active power mode of a device can be defined such that the components in the device receive sufficient power to be fully operational. For example, if the device is a video playback receiver, the device is able to fully function to output video/audio.

In some implementations, each device in the network can be assigned to a device class that is defined with its own usage patterns and usage characteristics. Examples of device classes can include a gaming device class, a television class, a router class, a video playback device class, etc. A device can be placed into an active power mode or reduced power mode based on usage characteristics and usage patterns associated with the other devices to which the device is connected to within the corresponding cascade network, as will be further described below with reference to FIGS. 1-5. By controlling when devices transition between active power mode and reduced power mode, less power can be consumed by these devices, while still providing full functionality of these devices.

Figure 1:
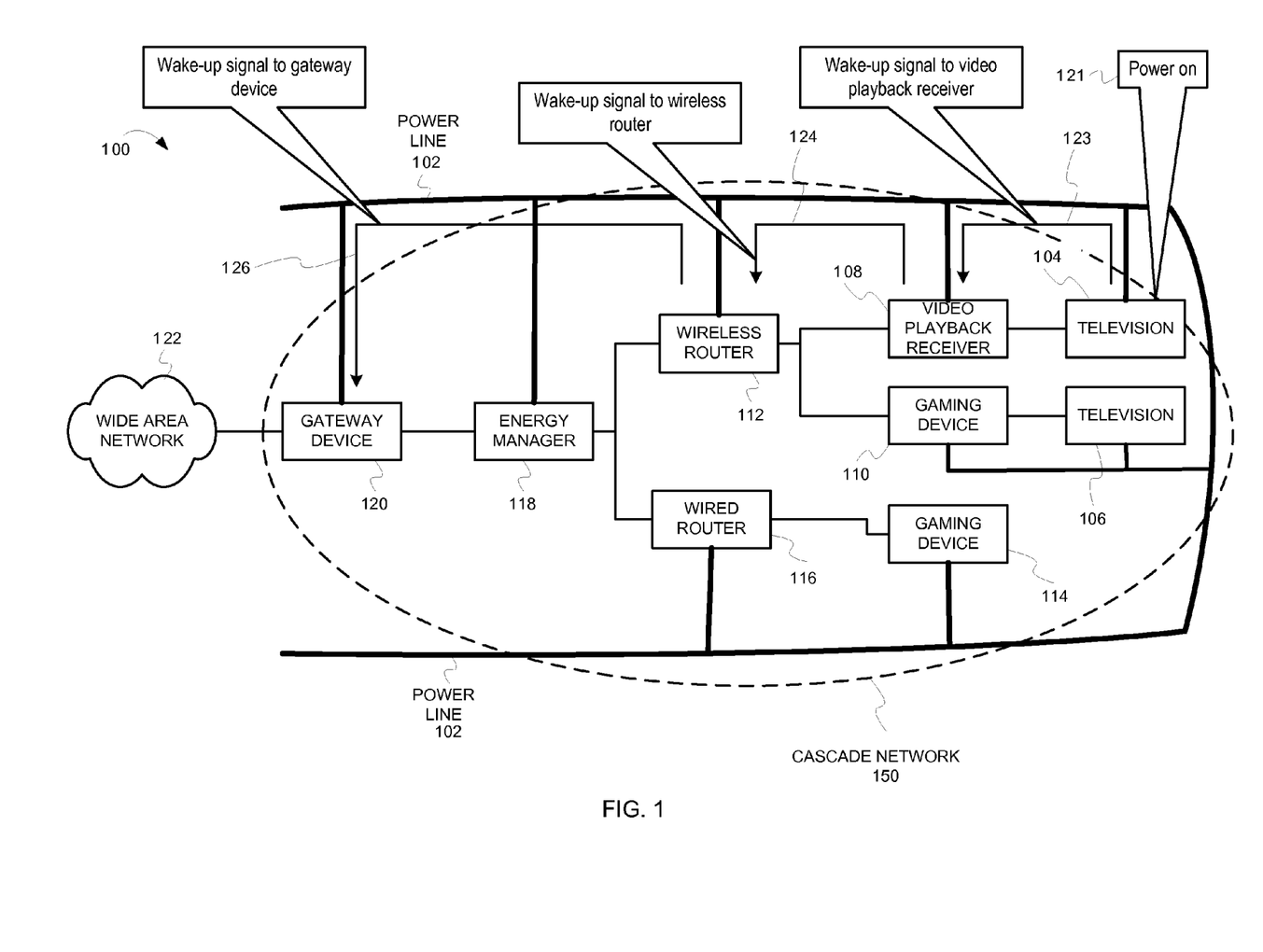
FIG. 1 depicts a block diagram of a system for power management of devices in a network, according to some embodiments.

FIG. 1 depicts a block diagram of a system for power management of devices in a network, according to some embodiments. In particular, FIG. 1 depicts a system 100 that includes a cascade network 150 that is communicatively coupled to a Wide Area Network (WAN) 122 (such as the Internet) through a gateway device 120. In this example, the cascade network 150 is a network for a home. However, embodiments can be incorporated into any type of network to provide power management to the devices therein. The cascade network 150 includes devices that are configurable to receive and transmit network communications. The devices can include a television 104, a television 106, a video playback receiver 108, a gaming device 110, a wireless router 112, a gaming device 114, and a wired router 116, an energy manager 118, and the gateway device 120.

As illustrated in FIG. 1, the cascade network 150 may include three different cascades that originate from the gateway device 120. A first cascade in the cascade network 150 includes the gateway device 120, the energy manager 118, the wireless router 112, the video playback receiver 108, and the television 104. The gateway device 120 is communicatively coupled to the energy manager 118, which is communicatively coupled to the wireless router 112. The wireless router 112 is communicatively coupled to the video playback receiver 108, which is communicatively coupled to the television 104. During operation, network communications received from the WAN 122 that are destined for the television 104 are transmitted through the gateway device 120, the energy manager 118, the wireless router 112, and the video playback receiver 108. Conversely, network communications transmitted from the television 104 that are destined for a remote network node (e.g., remote server) on the WAN 122 are transmitted through the video playback receiver 108, the wireless router 112, the energy manager 118, and the gateway device 120. In this example, the wireless router 112 and the video playback receiver 108 are connectivity devices for the television 104. Accordingly, there is a dependency among the devices in the cascade for network communications. For example, if the video playback receiver 108 is not operational, the television 104 is unable to receive and transmit network communications from and to devices on the WAN 122.

A second cascade in the cascade network 150 includes the gateway device 120, the energy manager 118, the wireless router 112, the gaming device 110, and the television 106. The gateway device 120 is communicatively coupled to the energy manager 118, which is communicatively coupled to the wireless router 112. The wireless router 112 is communicatively coupled to the gaming device 110, which is communicatively coupled to the television 106. During operation, network communications received from the WAN 122 that are destined for the television 106 are transmitted through the gateway device 120, the energy manager 118, the wireless router 112, and the gaming device 110. Conversely, network communications transmitted from the television 106 that are destined for a remote network node (e.g., remote server) on the WAN 122 are transmitted through the gaming device 110, the wireless router 112, the energy manager 118, and the gateway device 120. In this example, the wireless router 112 and the gaming device 110 are connectivity devices for the television 106.

A third cascade in the cascade network 150 includes the gateway device 120, the energy manager 118, the wired router 116, and the gaming device 114. The gateway device 120 is communicatively coupled to the energy manager 118, which is communicatively coupled to the wired router 116. The wired router 116 is communicatively coupled to the gaming device 114. During operation, network communications received from the WAN 122 that are destined for the gaming device 114 are transmitted through the gateway device 120, the energy manager 118, and the wired router 116. Conversely, network communications transmitted from the gaming device 114 that are destined for a remote network node (e.g., remote server) on the WAN 122 are transmitted through the wired router 116, the energy manager 118, and the gateway device 120. In this example, the wired router 116 is a connectivity device for the gaming device 114.

In some embodiments, power is provided to the devices in the cascade network 150 through a power line 102 that is shared among the devices. The gateway device 120, the energy manager 118, the wired router 116, the gaming device 114, the wireless router 112, the gaming device 110, the video playback receiver 108, the television 106, and the television 104 are coupled to the power line 102. In some embodiments, at least some network communications among the devices can be made through Powerline Communications (PLC) over the power line 102.

The energy manager 118 can be implemented in software, hardware, firmware, or a combination thereof. In some embodiments, the energy manager 118 can be in a separate device (as shown in FIG. 1). In some other embodiments, the energy manager 118 can be incorporated into any one of the devices in the cascade network 150 (e.g., the gateway device 120). The energy manager 118 can remotely control the power management of any of the devices in the cascade network 150. For example, the energy manager 118 can change a device from an active power mode to a reduced power mode or vice versa, as will be further described below. This change in one device can also affect power management of other devices in the cascade network that the one device depends on for network communications (as described herein). In some embodiments, users can use smartphone applications or other remote applications to interface with the energy manager 118 based on network communications through the WAN 122. Using these applications, users can remotely control the power management of the devices in the cascade network 150. This control can include powering on the device, powering off the device, placing the device into active power mode, placing the device into a reduced power mode, etc.

In some embodiments, the energy manager 118 can store the configuration settings for the different device classes that are defined by usage characteristics and usage patterns of the devices. The configuration settings can include a mapping that translates a device class to a length of time to remain in an active power mode. For example, a mapping between a device class and a length of time to remain in an active power mode can be based on one or more of the type of device, time of day, day of the month, user identification, type of activity, etc. As an example, the energy manager 118 can store a mapping that indicates that the length of time to remain in an active power mode is 1.5 hours for the television class for a specific user for a particular time of day. The energy manager 118 can also transmit these configuration settings to the different devices in the cascade network 150. The different devices can then store these configuration settings for the different device classes. There can also be different divisions in a device class, where a different division can define different lengths of time to remain in an active power mode. For example, the television class can be divided into primary and secondary division. A primary television class can be for those televisions that are considered the primary for the home (e.g., the television in the family room). A secondary television class can be for those televisions that are secondarily used in the home (e.g., televisions in the bedroom, kitchen, etc.). Televisions in the primary television class can have higher and different usages in comparison to television in the secondary television class. Accordingly, there can be separate mappings for the different divisions in a device class.

Figure 2:
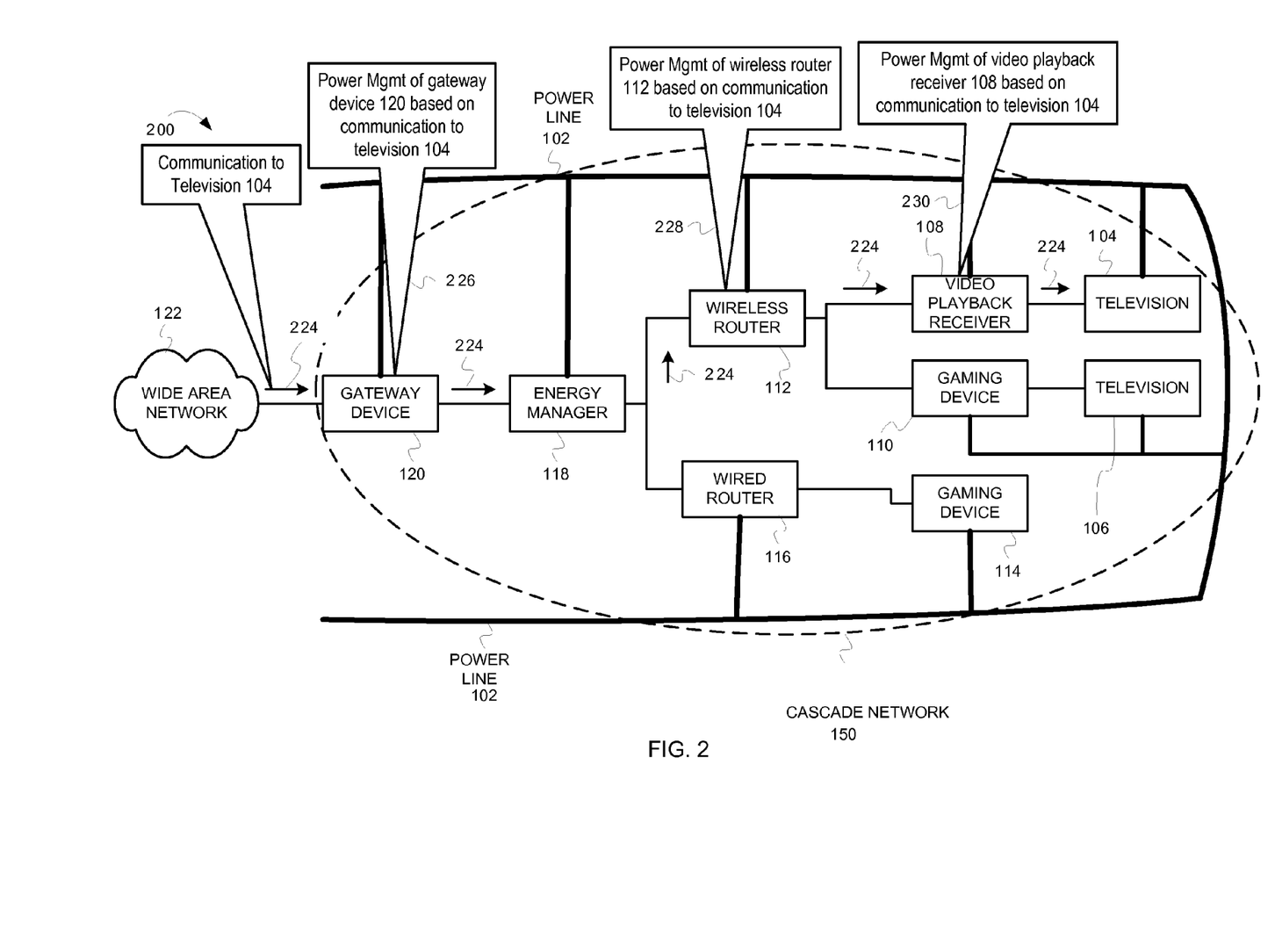
FIG. 2 depicts a block diagram of a system for power management of devices in a network, according to some embodiments.
Figure 4:
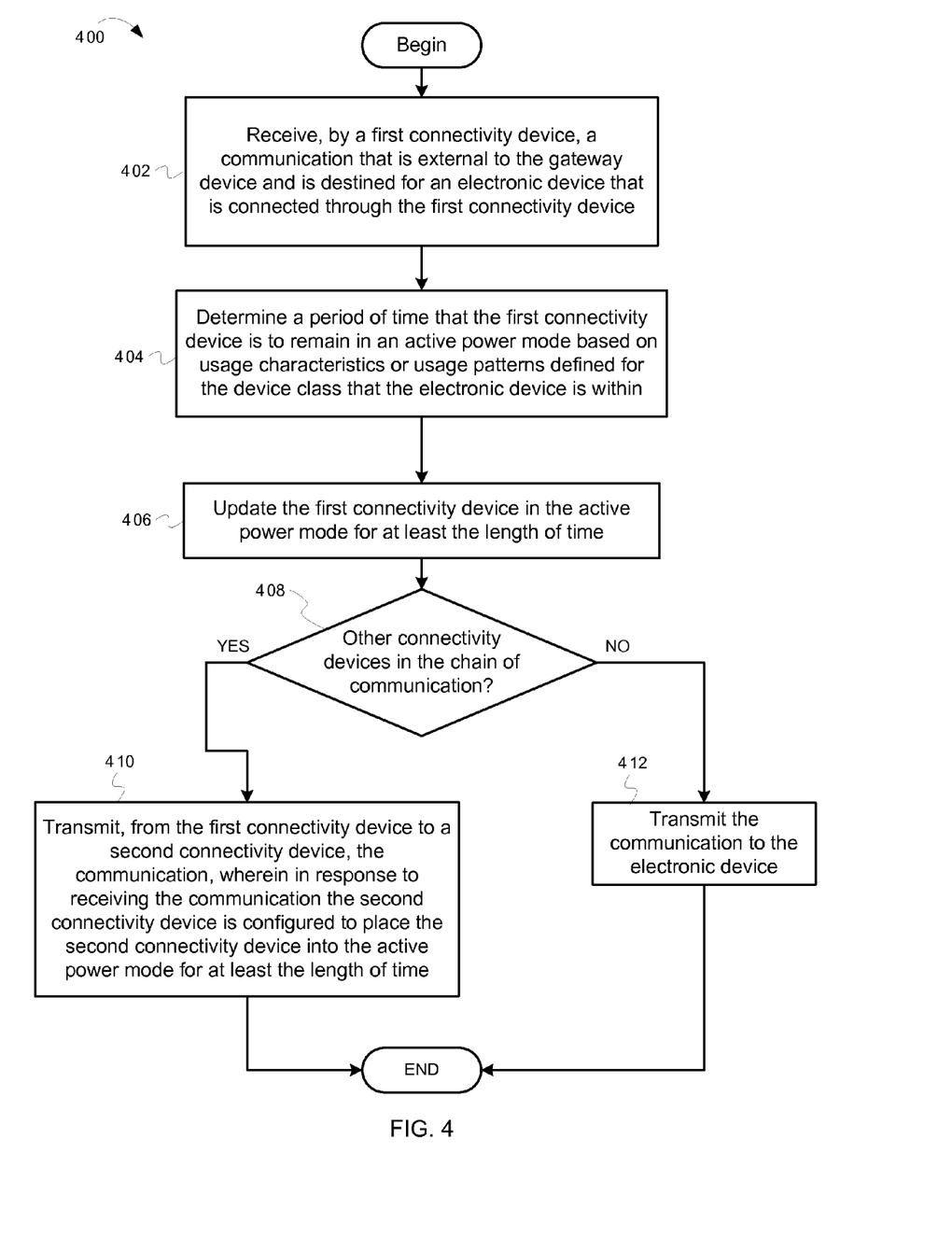
FIG. 4 depicts a flowchart illustrating example operations for power management of a device based on usage patterns/characteristics of other devices to which the device is connected, according to some embodiments.

The energy manager 118 can also store mappings between destination addresses of network communications and the class of device that is associated with the destination address. For example, for network communications having a destination address of 103.11.x.x, the device class is a gaming device. Therefore, network communications having a particular destination address can be associated with a length of time based on the device class. A destination address can then be used to determine a length of time based on one or more of the type of device, time of day, day of the month, user identification, type of activity, etc. FIGS. 2 and 4 (which are further described below) provide an example of using a mapping to translate a destination address to a length of time to be active for the connectivity devices.

The mappings between a device class and a length of time to remain active can be based on prior average activities generally determined for a device class for an average home network. Alternatively or in addition, these mappings can be specific to a particular home network. For example, specific users, specific activities, specific times of day, specific days of the month, etc. for a particular device class for a particular home network can be recorded by the electronic devices in the cascade network 150. The electronic devices (e.g., the television 104) can transmit this data to the energy manager 118. The energy manager 118 can then create and update these mappings based on usage of the devices in this particular cascade network. For example, the energy manager 118 can maintain an average usage for devices in a particular device class for a given time of day, for a given day in a month, etc. The energy manager 118 can update this average over time as additional usage activity is received from different electronic devices. Accordingly, the mappings can be tailored to the individual home. Users can also override these configuration settings for these different device classes. For this example, the user can change a particular television class to only cause an active power mode for 1 hour during a given week, month, etc. In some embodiments, users can use smartphone applications or other remote applications to interface with the energy manager 118 based on network communications through the WAN 122. In some embodiments, the energy manager 118 (or the subsystem in the device where the energy manager 118 is executing) is maintained in an active power mode and is not placed into a reduced power mode in order to be available for local and remote power management.

In one example, the television 104 is powered on—power on 121. For example, a user of the television 104 may turn on the television 104. In response, a wake-up signal is transmitted from the television 104 to the rest of the devices of the first cascade (e.g., connectivity devices) over the power line 102. In some embodiments, the wake-up signal may be a low power signal. The low power signal can range from a few hundred microvolts to a number of millivolts, dependent on the receiver sensitivity. Also, the low power signal can be an impulse signal, square wave, etc.

As illustrated in FIG. 1, the television 104 can transmit a wake-up signal 123 to the video playback receiver 108 along the power line 102. The wake-up signal can include a unique signature that is associated with a class of the device that sent or originated the wake-up signal. For example, the wake-up signal can be a packet that includes a unique class identifier (e.g., a unique bit pattern) in the preamble or header of the packet). The unique signature can be a unique bit pattern from the identifier of the device. The unique signature can also be derived from a complex algorithm to uniquely identify the device. The granularity of the unique signature can be unique per device to unique for a class of device. Also, the length of the unique signature can be dependent on the granularity of the uniqueness of the signature. Each device class can have a unique signature that is incorporated into the wake-up signal. In one example, the wake-up signal 123 can include a unique signature for a television class so that the video playback receiver 108 (and the other devices in the first cascade) can associate the wake-up signal 123 with the television class.

Figure 5:
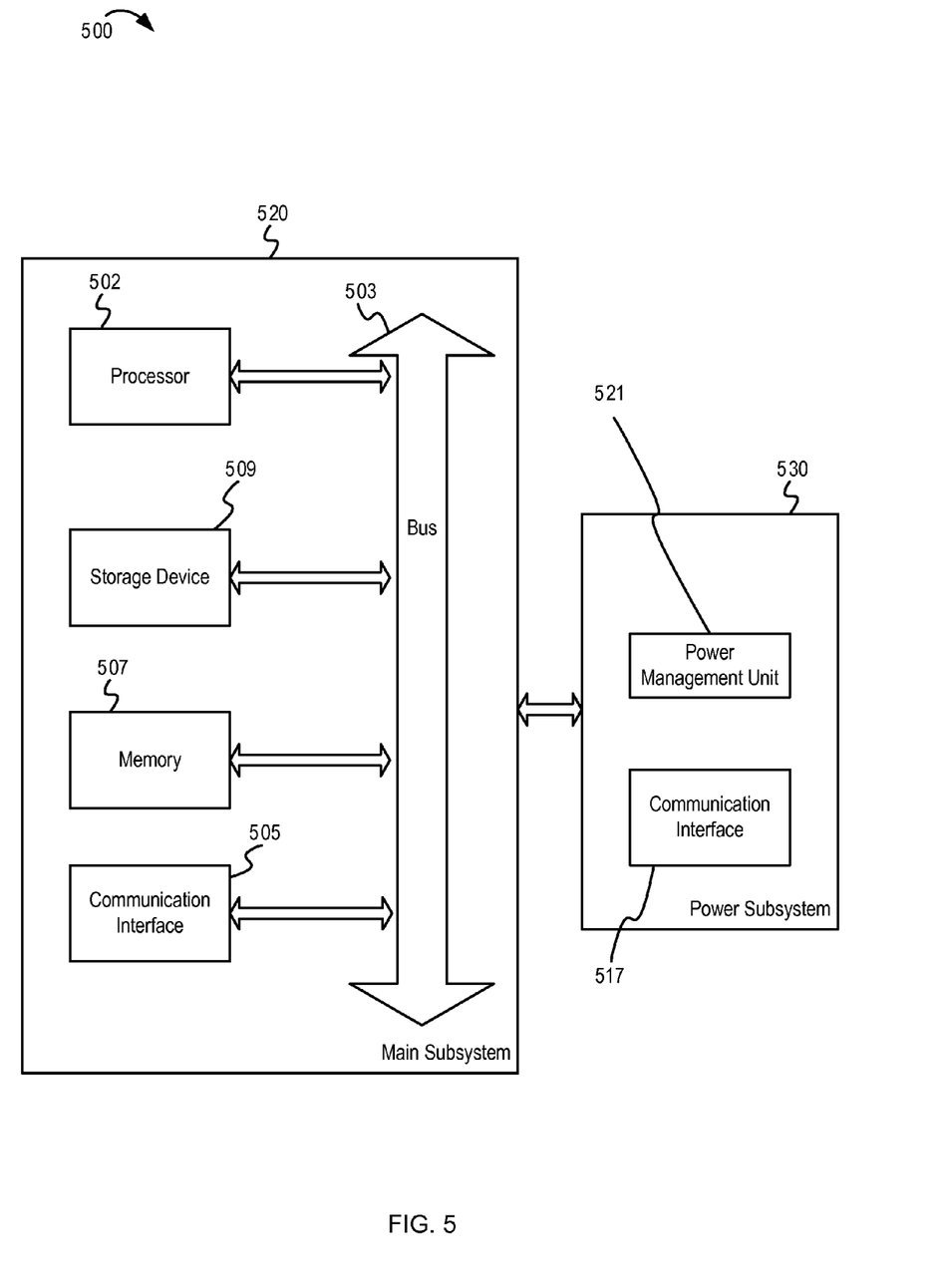
FIG. 5 depicts a block diagram of a device having an architecture for power management, according to some embodiments.

The video playback receiver 108 may be in a reduced power mode when the wake-up signal 123 is received. In some embodiments, the devices in the cascade network 150, including the video playback receiver 108, may include a power subsystem and a main subsystem. FIG. 5 (which is further described below) depicts an example architecture of a device having a power subsystem and a main subsystem. In some implementations, in the reduced power mode, the power subsystem of the video playback receiver 108 may remain powered on in order to receive and process the wake-up signal 123, and the main subsystem is powered off or in a sleep mode. In response to receiving the wake-up signal 123, a power management unit in the power subsystem of the video playback receiver 108 can cause the video playback receiver 108 to switch to an active power mode (if currently in the reduced power mode). For example, in response to receiving the wake-up signal 123, the power manage unit can turn on power to the main subsystem of the video playback receiver 108 and/or transmit an instruction to the main subsystem of the video playback receiver 108 to change to the active power mode. The main subsystem of the video playback receiver 108 can then remain in the active power mode for a period of time that is defined for the television class based on the usage patterns and usage characteristics associated with the television class. In other words, the length of time to remain active can be defined by the mapping for the television class based on one or more of the type of device, time of day, day of the month, etc. For example, assume that the wake-up signal 123 from the television 104 was received at 6 am on a weekday. Based on usage patterns and usage characteristics for the television, a television in the television class typically stays active until 8 am on a weekday. Accordingly, receiving a wake-up signal with the unique signature for the television class causes the video playback receiver 108 to remain in an active power mode for 2 hours.

As described above, the configuration settings that are based on previous viewing experiences can be specific to a particular user or group of users. For example, some type of user identification can be included when the television 104 is powered on—the power on 121. The user's gender, age, etc. that is derived from the user identification can be used to determine a length of time for the active power mode. For example, for a female that is older than 10 years old for this time of day, the length of time for the active power mode can be set to 1.5 hours. Also, the configuration settings that are based on previous viewing experiences can be specific to the type of activity that is occurring on the device. For example, if the television 104 is displaying a football game that typically lasts for at least three hours, the length of time for the active power mode can be set at the expiration of the three hours. In some embodiments, the user identification and the an activity identifier can be included along with the unique signature in the wake-up signal 123.

Also in response to receiving the wake-up signal 123, the video playback receiver 108 transmits a wake-up signal 124 to the wireless router 112 of the first cascade. In the example of FIG. 1, the video playback receiver 108 transmits the wake-up signal 124 to the wireless router 112 along the power line 102. The wake-up signal 124 can include the unique signature for the television class (as described above for the wake-up signal 123). This unique signature provides notification to the wireless router 112 of the television class (the device class that the device is within that is originating this wake-up signal).

The wireless router 112 may be in a reduced power mode when the wake-up signal 124 is received. Similar to the video playback receiver 108, the wireless router 112 may include a power subsystem and a main subsystem. In some implementations, in the reduced power mode, the power subsystem of the wireless router 112 may remain powered on in order to receive and process the wake-up signal 124, and the main subsystem is powered off or in a sleep mode. In response to receiving the wake-up signal 124, a power management unit in the power subsystem of the wireless router 112 can cause the wireless router 112 to switch to an active power mode (if currently in the reduced power mode). For example, in response to receiving the wake-up signal 124, the power management unit can turn on power to the main subsystem of the wireless router 112 and/or transmit an instruction to the main subsystem of the wireless router 112 to change to the active power mode. The main subsystem of the wireless router 112 can then remain in the active power mode for a period of time that is defined for the television class based on the usage patterns and usage characteristics associated with the television class.

Also in response to receiving the wake-up signal 124, the wireless router 112 transmits a wake-up signal 126 to the gateway device 120 of the first cascade. In the example of FIG. 1, the wireless router 112 transmits the wake-up signal 126 to the gateway device 120 along the power line 102. The wake-up signal 126 can include the unique signature for the television class (as described above for the wake-up signal 123 and the wake-up signal 124). This unique signature provides notification to the gateway device 120 of the television class (the device class that the device is within that is originating this wake-up signal).

The gateway device 120 may be in a reduced power mode when the wake-up signal 126 is received. Similar to the video playback receiver 108, the gateway device 120 may include a power subsystem and a main subsystem. In some implementations, in the reduced power mode, the power subsystem of the gateway device 120 may remain powered on in order to receive and process the wake-up signal 126, and the main subsystem is powered off or in a sleep mode. In response to receiving the wake-up signal 126, a power management unit in the power subsystem of the gateway device 120 can cause the gateway device 120 to switch to an active power mode (if currently in the reduced power mode). For example, in response to receiving the wake-up signal 126, the power management unit can turn on the power to the main subsystem of the gateway device 120 and/or transmit an instruction to the main subsystem of the gateway device 120 to change to the active power mode. The main subsystem of the gateway device 120 can then remain in the active power mode for a period of time that is defined for the television class based on usage patterns and usage characteristics associated with the television class.

The wake-up signals are forwarded to each device in the first cascade until the gateway device 120 has been reached. Accordingly, each device in the first cascade that is part of the network communications between the WAN 122 and the television 104 can be updated to be an active power mode based on the usage characteristics and usage patterns of the television 104. In other words, the usage characteristics and usage patterns of a device (e.g., the television 104) can affect the power management of other devices (the video playback receiver 108, the wireless router 112, and the gateway device 120) that are to provide network communications to the device. As described, other devices in the cascade network 150 that are not in the first cascade are not required to be affected by the power on 121 of the television 104. Only those devices in the first cascade that are part of the connectivity for network communications of the television 104 in the cascade network 150 can be placed into an active power mode for a length of time defined by usage characteristics and usage patterns of the television 104.

FIG. 2 depicts a block diagram of a system for power management of devices in a network, according to some embodiments. FIG. 2 has a similar network configuration as FIG. 1. However, in contrast to the example depicted in FIG. 1, FIG. 2 depicts operations where network communications (e.g., communication for a power on operation) to the electronic device received over the cascade network initiates a series of power management operations. This is in contrast to FIG. 1, where a local power on operation at the device initiates a series of power management operations through the first cascade. As described above, the operations of FIG. 1 can be initiated by a user that powers on the electronic device (the television 104) using a remote control to locally control the electronic device. In contrast, FIG. 2 depicts operations where network communications are transmitted over the cascade network 150 to the electronic device (the television 104) through the first cascade. In response, these network communications cause power management operations in the devices that are in the first cascade and used to transmit the network communications to the electronic device (as will now be described). For the network communications depicted in FIG. 2, if a device is in a reduced power mode, the network communications transmitted over the cascade network 150 (as will now be described) to the device can be received by a communication interface in the power subsystem of the device. Conversely, if the device is in an active power mode, the network communications transmitted over the cascade network 150 to the device can be received by a communication interface in the main subsystem of the device.

FIG. 2 depicts a system 200 that includes the components depicted in the system 100 of FIG. 1 with different network communications to initiate power management. In this example, the power management operations are initiated by network communications from a remote network node (e.g., a remote server) on the WAN 122 that is destined for an electronic device in the cascade network 150. As shown, a communication 224 is received from the WAN 122 and is destined for the television 104. The gateway device 120 receives the communication 224. If the gateway device 120 is in a reduced power mode, a communication interface in the power subsystem in the gateway device 120 can receive the communication 224. If the gateway device 120 is in an active power mode, a communication interface in the main subsystem of the gateway device 120 can receive the communication 224. In response, the gateway device 120 performs power management operations (226). In particular, if the gateway device 120 is in a reduced power mode, a power management unit in the power subsystem in the gateway device 120 can cause the gateway device 120 to change to an active power mode (if currently in the reduced power mode), wherein the main subsystem can become powered and fully operational. For example, in response to receiving the communication 224, the power management unit can turn on power to the main subsystem of the gateway device 120 and/or transmit an instruction to the main subsystem of the gateway device 120 to change to the active power mode.

Also as part of the power management operations, the gateway device 120 can determine a class of the electronic device that is to receive the communication 224. The gateway device 120 can make this determination based on data in the communication 224 that identifies the destination address of the communication 224. For example, devices (e.g., the gateway device 120) in the network can store a mapping between a destination address of communications and the class of device that is associated with the destination address. Therefore, based on the destination address of the communication 224, the gateway device 120 can determine that the class of device for which the communication 224 is destined is a television class. As described above, each class of device defines a period of time that the device should be active based on usage characteristics and/or usage patterns. This period of time can be based on the type of device, the time of day, etc. For example, assume that the electronic device is in the television class and that the communication 224 was received at 7:15 pm on a weekday. Based on usage patterns and usage characteristics for the television class, an electronic device in this television class typically stays active until 11 pm on a weekday after being powered on between 7-11 pm. Accordingly, after determining the class of device for the communication 224, the gateway device 120 can determine a period of time that the main subsystem of the gateway device 120 is to remain in the active power mode. The gateway device 120 also forwards the communication 224 to the energy manager 118. As described above, the energy manager 118 can remain in an active power mode. Accordingly, no power management operations are needed in the energy manager 118. The energy manager 118 can transmit the communication 224 to the wireless router 112.

The wireless router 112 receives the communication 224. If the wireless router 112 is in a reduced power mode, a communication interface in the power subsystem in the wireless router 112 can receive the communication 224. If the wireless router 112 is in an active power mode, a communication interface in the main subsystem of the wireless router 112 can receive the communication 224. In response, the wireless router 112 performs power management operations (228). In particular, if the wireless router 112 is in a reduced power mode, a power management unit in the power subsystem in the wireless router 112 can cause the wireless router 112 to change to an active power mode (if currently in the reduced power mode), wherein the main subsystem can become powered and fully operational. For example, in response to receiving the communication 224, the power management unit can turn on power to the main subsystem of the wireless router 112 and/or transmit an instruction to the main subsystem of the wireless router 112 to change to the active power mode.

Also as part of the power management operations, the wireless router 112 can determine a class of the electronic device that is to receive the communication 224. The wireless router 112 can make this determination based on data in the communication 224 (as described above). After determining the class of device for the communication 224, the wireless router 112 can determine a period of time that the main subsystem of the wireless router 112 is to remain in the active power mode. The wireless router 112 also forwards the communication 224 to the video playback receiver 108.

The video playback receiver 108 receives the communication 224. If the video playback receiver 108 is in a reduced power mode, a communication interface in the power subsystem in the video playback receiver 108 can receive the communication 224. If the video playback receiver 108 is in an active power mode, a communication interface in the main subsystem of the video playback receiver 108 can receive the communication 224. In response, the video playback receiver 108 performs power management operations (230). In particular, if the video playback receiver 108 is in a reduced power mode, a power management unit in the power subsystem in the video playback receiver 108 can cause the video playback receiver 108 to change to an active power mode (if currently in the reduced power mode), wherein the main subsystem can become powered and fully operational. For example, in response to receiving the communication 224, the power management unit can turn on power to the main subsystem of the video playback receiver 108 and/or transmit an instruction to the main subsystem of the video playback receiver 108 to change to the active power mode.

Also as part of the power management operations, the video playback receiver 108 can determine a class of the electronic device that is to receive the communication 224. The video playback receiver 108 can make this determination based on data in the communication 224 (as described above). After determining the class of device for the communication 224, the video playback receiver 108 can determine a period of time that the main subsystem of the video playback receiver 108 is to remain in the active power mode. The video playback receiver 108 also forwards the communication 224 to the television 104 (the destination of the communication 224).

Figure 3:
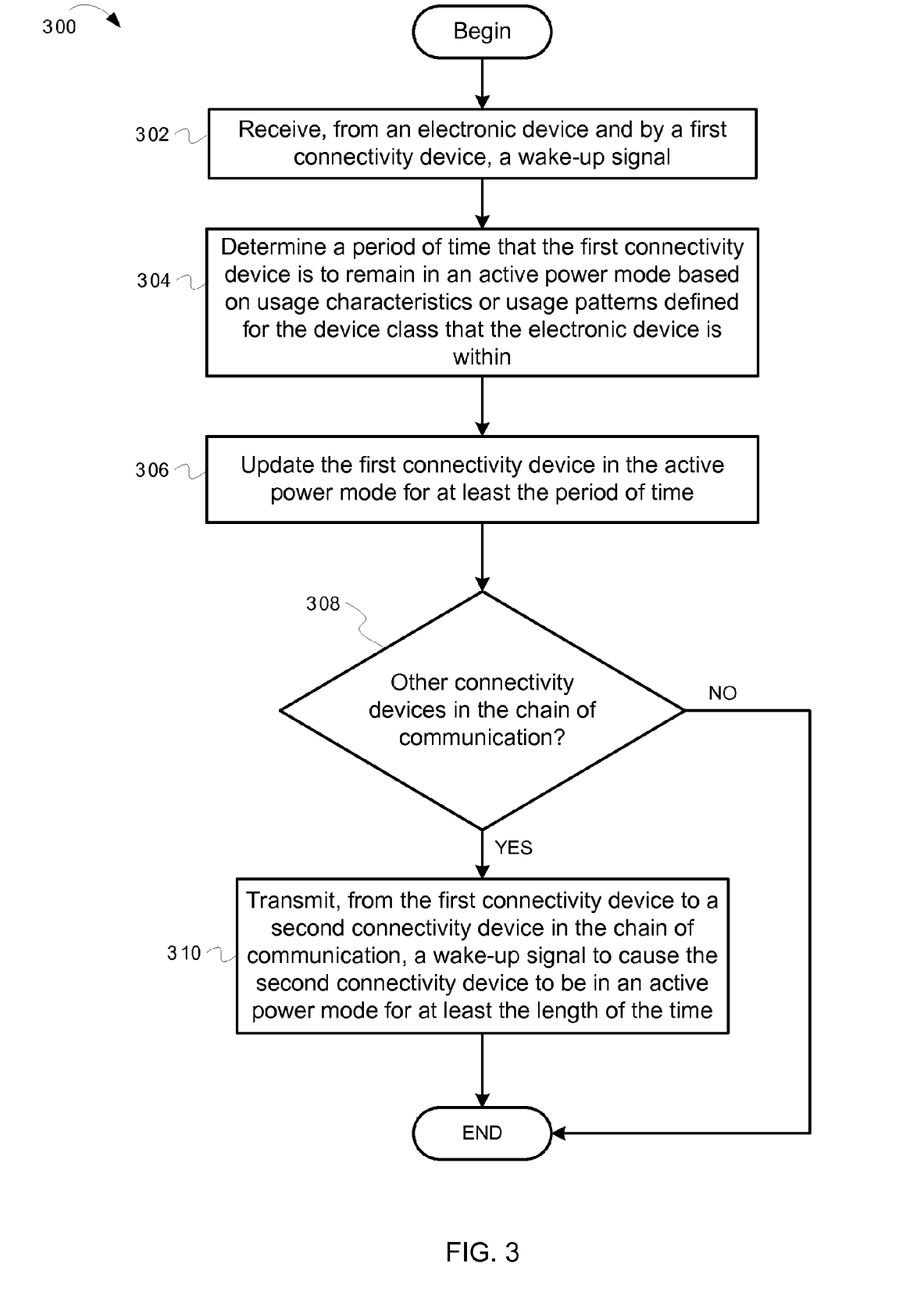
FIG. 3 depicts a flowchart illustrating example operations for power management of a device based on usage patterns/characteristics of other devices to which the device is connected, according to some embodiments.

FIG. 3 depicts a flowchart illustrating example operations for power management of a device based on usage patterns/characteristics of other devices to which the device is connected, according to some embodiments. The operations of a flowchart 300 are described in reference to FIG. 1. The flowchart 300 illustrates example operations that can occur in response to an electronic device being powered on locally (and not caused by a communication received over the cascade network). Also, the flowchart 300 illustrates example operations from the perspective of one of the connectivity devices that are used to provide communication for an electronic device. These example operations in the flowchart 300 can be performed by each connectivity device that is to provide communication for an electronic device. The operations of the flowchart 300 begin at block 302.

At block 302, a first connectivity device receives a wake-up signal from an electronic device. With reference to FIG. 1, the video playback receiver 108 receives the wake-up signal 123 from the television 104. In this example, the wake-up signal 123 is received in response to the television 104 being powered on—the power on 121. For example, a user of the television 104 may turn on the television 104. The power on 121 can initiate a series of wake-up signals that are transmitted through the first cascade of the cascade network 150 (as described above). In this example, the communications are wake-up signals that are transmitted over the power line 102. Operations of the flowchart 300 continue at block 304.

At block 304, the first connectivity device determines a period of time that the first connectivity device is to remain in an active power mode based on usage characteristics or usage patterns defined for the device class that the electronic device is within. As described above, each device class can define a period of time that a device is active based on particular time of day, a particular day, a particular user, the type of activity that is occurring on the device, etc. Accordingly, the first connectivity device can determine the period of time based on the device class, the particular time of day, the particular day, a particular user, the type of activity that is occurring on the device, etc. Operations of the flowchart 300 continue at block 306.

At block 306, the first connectivity device updates to be in the active power mode for at least the period of time determined. The first connectivity device may or may not be in the active power mode at the time of receiving this wake-up signal. The power subsystem of the first connectivity device can cause the first connectivity device to switch to an active power mode (if currently in the reduced power mode). The main subsystem of the first connectivity device can then remain in the active power mode for at least the period of time that is determined. Operations of the flowchart 300 continue at block 308.

At block 308, the first connectivity device determines whether there are other connectivity devices in the chain of communication for the electronic device. With reference to FIG. 1 and assuming the first connectivity device is the video playback receiver 108, the video playback receiver 108 can determine that the wireless router 112 is another connectivity device in the first cascade in the chain of communication for the television 104. However, if the connectivity device were the last connectivity device in the chain of communication (e.g., the gateway device 120), the connectivity device would determine there are no other connectivity devices in the chain of communication for the electronic device. If there are no other connectivity devices in the chain of communication for the electronic device, operations of the flowchart 300 are complete. Otherwise, operations of the flowchart 300 continue at block 310.

At block 310, the first connectivity device transmits to a second connectivity device in the chain of communication a wake-up signal to cause the second connectivity device to be in an active power mode for at least the length of the time. With reference to FIG. 1 and assuming the first connectivity device is the video playback receiver 108, the power subsystem of the video playback receiver 108 transmits a wake-up signal 124 through the first cascade to the wireless router 112. In the example of FIG. 1, the power subsystem of the video playback receiver 108 transmits the wake-up signal 124 to the wireless router 112 along the power line 102. The wake-up signal 124 can include the unique signature for the television class (as described above for the wake-up signal 123). This unique signature provides notification to the wireless router 112 of which device class the device is within that is originating this wake-up signal. Upon receipt of the wake-up signal 124, the second connectivity device can perform power management operations (similar to those described for the first connectivity device). Operations of the flowchart 300 are complete. The operations of the flowchart 300 can be performed by each of the connectivity devices in a cascade and that are part of the chain of communication for an electronic device.

FIG. 4 depicts a flowchart illustrating example operations for power management of a device based on usage patterns/ characteristics of other devices to which the device is connected, according to some embodiments. The operations of a flowchart 400 are described in reference to FIG. 2. The flowchart 400 illustrates example operations that can occur in response to a communication that is to be transmitted through the first cascade to an electronic device. Also, the flowchart 400 illustrates example operations from the perspective of one of the connectivity devices that are used to provide communication for an electronic device. These example operations in the flowchart 400 can be performed by each connectivity device that is to provide communication for an electronic device. The operations of the flowchart 400 begin at block 402.

At block 402, a first connectivity device receives a communication that is received from a remote network node on the WAN 122 that is external to the gateway device and is destined for an electronic device that is connected through the first connectivity device. With reference to FIG. 2 and assuming the first connectivity device is the gateway device 120, a communication 224 is received from a remote network node (e.g., a remote server) on the WAN 122 and is destined for the television 104. The gateway device 120 receives the communication 224. If the gateway device 120 is in a reduced power mode, a communication interface in the power subsystem in the gateway device 120 can receive the communication 224. If the gateway device 120 is in an active power mode, a communication interface in the main subsystem of the gateway device 120 can receive the communication 224. Operations of the flowchart 400 continue at block 404.

At block 404, the first connectivity device determines a period of time that the first connectivity device is to remain in an active power mode based on usage characteristics or usage patterns defined for the device class that the electronic device is within. The first connectivity device can determine a class of the electronic device that is to receive the network communications. With reference to FIG. 2 and assuming the first connectivity device is the gateway device 120, the gateway device 120 can make this determination based on data in the communication 224 that identifies the destination address of the communication 224 (e.g., the preamble in the data packet). For example, devices (e.g., the gateway device 120) in the network can store a mapping between a destination address of network communications and the class of device that is associated with the destination address. Therefore, based on the destination address of the communication 224, the gateway device 120 can determine that the class of device for which the communication 224 is destined is a television class. As described above, each class of device defines a period of time that the device should be active based on usage characteristics and/or usage patterns. This period of time can be based on the device class, the particular time of day, the particular day, a particular user, the type of activity that is occurring on the device, etc. Operations of the flowchart 400 continue at block 406.

At block 406, the first connectivity device updates to be in the active power mode for at least the period of time determined. The first connectivity device may or may not be in the active power mode at the time of receiving this communication. A power management unit in the power subsystem of the first connectivity device can cause the first connectivity device to switch to an active power mode (if currently in the reduced power mode). The main subsystem of the first connectivity device can then remain in the active power mode for at least the period of time that is determined. Operations of the flowchart 400 continue at block 408.

At block 408, the first connectivity device determines whether there are other connectivity devices in the chain of communication for the electronic device. With reference to FIG. 1 and assuming the first connectivity device is the gateway device 120, the gateway device 120 can determine that the wireless router 112 is another connectivity device in the first cascade in the chain of communication for the television 104. However, if the connectivity device were the last connectivity device in the chain of communication (e.g., the video playback receiver 108), the connectivity device would determine there are no other connectivity devices in the chain of communication for the electronic device. If there are no other connectivity devices in the chain of communication for the electronic device, operations of the flowchart 400 continue at block 412. Otherwise, operations of the flowchart 400 continue at block 410.

At block 410, the first connectivity device transmits the network communications to a second connectivity device in the chain of communication for the electronic device. With reference to FIG. 2 and assuming the first connectivity device is the gateway device 120, the gateway device 120 transmits the network communications through the first cascade to the wireless router 212. In the example of FIG. 2, gateway device 120 transmits the communication 224 to the wireless router 112 along the network connection (e.g., Ethernet). In response to receiving the communication 224, the wireless router 112 can be updated to be in the active power mode for at least the length of time (similar to the operations performed at the gateway device 120). Operations of the flowchart 400 are complete along this path.

At block 412, the first connectivity device transmits the communication to the electronic device. In particular if there are no other connectivity devices in the chain of communication, the first connectivity device is the last device in the first cascade that is to be updated to be in an active power mode. With reference to FIG. 2 and assuming that the first connectivity device is the video playback receiver 108, the video playback receiver 108 transmits the communication 224 to the television 104. Operations of the flowchart 400 are complete along this path. The operations of the flowchart 400 can be performed by each of the connectivity devices in a cascade and that are part of the chain of communication for an electronic device.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

FIG. 5 depicts a block diagram of a device in a network that includes power management, according to some embodiments. In some embodiments, a device 500 can be an electronic device (e.g., a personal computer (PC), a laptop, a netbook, a mobile phone, a personal digital assistant (PDA), a television, a wireless router, a wired router, a gateway device, a gaming device, a video playback receiver, or other electronic system). In other embodiments, the device 500 can be a subsystem embedded in another electronic device.

The device 500 includes two subsystems—a main subsystem 520 and a power subsystem 530. The main subsystem 520 and the power subsystem 530 can represent logical partitions in the device 500. The main subsystem 520 includes a processor 502 (possibly including multiple processors, multiple cores, multiple nodes, and/or implementing multi-threading, etc.). The main subsystem 520 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The main subsystem 520 also includes a bus 503 (e.g., PCI, ISA, PCI-Express, HyperTransport®, InfiniBand®, NuBus, etc.), a communication interface 505 (e.g., an ATM interface, an Ethernet interface, a Frame Relay interface, SONET interface, wireless interface, etc.), and a storage device(s) 509 (e.g., optical storage, magnetic storage, etc.). The processor 502, the storage device 509, the memory 507, and the communication interface 505 are coupled to the bus 503. Although illustrated as being coupled to the bus 503, the memory 507 may be coupled to the processor 502.

The power subsystem 530 includes a power management unit 521 and a communication interface 517. The power management unit 521 can perform the operations above to receive the wake-up signals from other devices in a network through the communication interface 517. With reference to FIG. 1, the power management unit 521 can receive the wake-up signals over the power line 102. With reference to FIG. 2, The power management unit 512 can also perform the operations above to receive the communications over the network if the device 500 is in a reduced power mode. Any of the functionality in the power management unit 521 may be partially (or entirely) implemented in hardware and/or on a processor (not shown). For example, the functionality may be implemented with an application specific integrated circuit, in logic implemented in a processor, in a co-processor on a peripheral device or card, etc. Further, realizations may include fewer or additional components not illustrated in FIG. 5 (e.g., video cards, audio cards, additional network interfaces, peripheral devices, etc.).

While the embodiments are described with reference to various implementations and exploitations, it will be understood that these embodiments are illustrative and that the scope of the inventive subject matter is not limited to them. In general, techniques for power management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for power management of devices, the method comprising:
   receiving, at a first connectivity device associated with a first class of devices, a first wake-up signal from a first electronic device associated with a second class of devices, wherein
      the first connectivity device is configured to provide communications in a first cascade of a cascade network between the first electronic device and a gateway device that provides access to an external network,
      the cascade network comprises the first cascade and a second cascade, and
      the first cascade includes the first connectivity device and the first electronic device and the second cascade includes a second connectivity device and a second electronic device;
   determining a first length of time that the first connectivity device is to remain in an active power mode based, at least in part, on a first usage pattern defined for the first electronic device of the second class of devices and on the first electronic device being in the first cascade, wherein
      the first usage pattern indicates a duration the first electronic device is expected to be in the active power mode, and
      the first length of time is different than a second length of time associated with the active power mode of the second connectivity device of the second cascade, the second length of time based, at least in part, on a second usage pattern defined for the second electronic device of the second class of devices and on the second electronic device being in the second cascade; and
   updating the first connectivity device to be in the active power mode for at least the first length of time.

2. The method of claim 1, further comprising:
   determining a third connectivity device associated with a third class of devices is coupled between the first connectivity device and the gateway device to provide the communications between the gateway device and the first electronic device; and
   transmitting, from the first connectivity device to the third connectivity device, a second wake-up signal to cause the third connectivity device to be in the active power mode for at least the first length of time.

3. The method of claim 2, wherein the second wake-up signal comprises a unique signature for identification of the first electronic device of the second class of devices.

4. The method of claim 1, wherein the first wake-up signal comprises a unique signature for identification of the first electronic device of the second class of devices.

5. The method of claim 1, wherein the first wake-up signal is transmitted over a power line that is configured to supply power to the first electronic device and the first connectivity device.

6. The method of claim 1, wherein the duration is based on at least one member selected from the group consisting of a time of when the first wake-up signal is received and a day when the first wake-up signal is received.

7. The method of claim 1, wherein the duration is based on at least one member selected from the group consisting of identity of a user of the first electronic device when the first wake-up signal is received and a type of activity occurring at the first electronic device.

8. A method for power management of devices, the method comprising:
   receiving, at a first connectivity device associated with a first class of devices, a communication from an external network, the communication destined for a first electronic device that is coupled to a gateway device through the first connectivity device in a first cascade of a cascade network, wherein
      the first electronic device is associated with a second class of devices,
      the cascade network comprises the first cascade and a second cascade, and
      the first cascade includes the first connectivity device and the first electronic device and the second cascade includes a second connectivity device and a second electronic device;
   in response to receiving the communication,
      determining a first length of time that the first connectivity device is to remain in an active power mode based, at least in part, on a first usage pattern defined for the first electronic device of the second class of devices and on the first electronic device being in the first cascade, wherein
         the first usage pattern indicates a duration the first electronic device is expected to be in the active power mode, and
         the first length of time is different than a second length of time associated with the active power mode of the second connectivity device of the second cascade, the second length of time based, at least in part, on a second usage pattern defined for the second electronic device of the second class of devices and on the second electronic device being in the second cascade; and
      updating the first connectivity device to be in the active power mode for at least the first length of time.

9. The method of claim 8, wherein a third connectivity device associated with a third class of devices is coupled between the first connectivity device and the first electronic device to provide the communication to the first electronic device, wherein the method comprises,
transmitting, from the first connectivity device to the third connectivity device, the communication to cause the third connectivity device to be in the active power mode for at least the first length of time.

10. The method of claim 8, wherein the duration is based, at least in part, on at least one member selected from the group consisting of a time of when the communication is received and a day when the communication is received.

11. The method of claim 8, wherein the duration is based, at least in part, on at least one member selected from the group consisting of identity of a user of the first electronic device when the communication is received and a type of activity occurring at the first electronic device.

12. A non-transitory machine-readable medium, having instructions stored therein, which when executed by one or more processors of a first connectivity device cause the first connectivity device to perform operations that comprise:
receiving, the first connectivity device associated with a first class of devices, a first wake-up signal from a first electronic device associated with a second class of devices, wherein
the first connectivity device is configured to provide communications in a first cascade of a cascade network between the first electronic device and a gateway device that provides access to an external network,
the cascade network comprises the first cascade and a second cascade, and
the first cascade includes the first connectivity device and the first electronic device and the second cascade includes a second connectivity device and a second electronic device;
determining a first length of time that the first connectivity device is to remain in an active power mode based, at least in part, on a first usage pattern defined for the second class of devices and on the first electronic device being in the first cascade, wherein
the first usage pattern indicates a duration the first electronic device is expected to be in the active power mode, and
the first length of time is different than a second length of time associated with the active power mode of the second connectivity device of the second cascade, the second length of time based, at least in part, on a second usage pattern defined for the second electronic device of the second class of devices and on the second electronic device being in the second cascade; and
updating the first connectivity device to be in the active power mode for at least the first length of time.

13. The non-transitory machine-readable medium of claim 12, wherein the operations further comprise:
determining that a third connectivity device associated with a third class of devices is coupled between the first connectivity device and the gateway device to provide the communications between the gateway device and the first electronic device; and
transmitting, from the first connectivity device to the third connectivity device, a second wake-up signal to cause the third connectivity device to be in the active power mode for at least the first length of time.

14. The non-transitory machine-readable medium of claim 13, wherein the second wake-up signal comprises a unique signature for identification of the first electronic device of the second class of devices.

15. The non-transitory machine-readable medium of claim 12, wherein the first wake-up signal comprises a unique signature for identification of the first electronic device of the second class of devices.

16. The non-transitory machine-readable medium of claim 12, wherein the first wake-up signal is transmitted over a power line that is configured to supply power to the first electronic device and the first connectivity device.

17. The non-transitory machine-readable medium of claim 12, wherein the duration is based on at least one member selected from the group consisting of a time of when the first wake-up signal is received and a day when the first wake-up signal is received.

18. The non-transitory machine-readable medium of claim 12, wherein the duration is based on at least one member selected from the group consisting of identity of a user of the first electronic device when the first wake-up signal is received and a type of activity occurring at the first electronic device.

19. A first connectivity device associated with a first class of devices, the first connectivity device comprising:
a communication interface configured to receive, from a first electronic device associated with a second class of devices, a first wake-up signal, wherein
the first connectivity device is configured to provide communications in a first cascade of a cascade network between the first electronic device and a gateway device that provides access to an external network,
the cascade network comprises the first cascade and a second cascade, and
the first cascade includes the first connectivity device and the first electronic device and the second cascade includes a second connectivity device and a second electronic device;
a processor; and
a memory configured to store instructions which, when executed by the processor, cause the first connectivity device to:
determine a first length of time that the first connectivity device is to remain in an active power mode based, at least in part, on a first usage pattern defined for the first electronic device of the second class of devices and on the first electronic device being in the first cascade, wherein
the first usage pattern indicates a duration the first electronic device is expected to be in the active power mode, and
the first length of time is different than a second length of time associated with the active power mode of the second connectivity device of the second cascade, the second length of time based, at least in part, on a second usage pattern defined for the second electronic device of the second class of devices and on the second electronic device being in the second cascade; and
update to the active power mode for the first connectivity device for at least the first length of time.

20. The first connectivity device of claim 19, wherein the instructions when executed by the processor further cause the first connectivity device to:
determine that a third connectivity device associated with a third class of devices is coupled between the first connectivity device and the gateway device to provide the communications between the gateway device and the first electronic device; and transmit, from the first connectivity device to the third connectivity device, a second wake-up signal to cause the third connectivity device to be in the active power mode for at least the first length of time.

21. The first connectivity device of claim 20, wherein the second wake-up signal comprises a unique signature for identification of the first electronic device of the second class of devices.

22. The first connectivity device of claim 19, wherein the first wake-up signal comprises a unique signature for identification of the first electronic device of the second class of devices.

23. The first connectivity device of claim 19, wherein the first wake-up signal is transmitted over a power line that is configured to supply power to the first electronic device and the first connectivity device.

24. The first connectivity device of claim 19, wherein the duration is based on at least one member selected from the group consisting of a time of when the first wake-up signal is received and a day when the first wake-up signal is received.

25. The first connectivity device of claim 19, wherein the duration is based on at least one member selected from the group consisting of identity of a user of the first electronic device when the first wake-up signal is received and a type of activity occurring at the first electronic device.

26. A first connectivity device associated with a first class of devices, the first connectivity device comprising:
a communication interface configured to receive a communication from an external network, the communication destined for a first electronic device that is coupled to a gateway device through the first connectivity device in a first cascade of a cascade network, wherein the first electronic device is associated with a second class of devices,
the cascade network comprises the first cascade and a second cascade, and the first cascade includes the first connectivity device and the first electronic device and the second cascade includes a second connectivity device and a second electronic device;
a processor; and
a memory configured to store instructions which, when executed by the processor, cause the first connectivity device to:
in response to receipt of the communication,
determine a first length of time that the first connectivity device is to remain in an active power mode based, at least in part, on a first usage pattern defined for the first electronic device of the second class of devices and on the first electronic device being in the first cascade, wherein
the first usage pattern indicates a duration the first electronic device is expected to be in the active power mode, and
the first length of time is different than a second length of time associated with the active power mode of the second connectivity device of the second cascade, the second length of time based, at least in part, on a second usage pattern defined for the second electronic device of the second class of devices and on the second electronic device being in the second cascade; and
update the first connectivity device to be in the active power mode for at least the first length of time.

27. The first connectivity device of claim 26, wherein a third connectivity device associated with a third class of devices is coupled between the first connectivity device and the first electronic device to provide the communication to the first electronic device, wherein the instructions when executed by the processor further cause the first connectivity device to:
transmit, to the third connectivity device, the communication to cause the third connectivity device to be in the active power mode for at least the first length of time.

28. The first connectivity device of claim 26, wherein the duration is based on at least one member selected from the group consisting of a time of when the communication is received and a day when the communication is received.

29. The first connectivity device of claim 26, wherein the duration is based on at least one member selected from the group consisting of identity of a user of the first electronic device when the communication is received and a type of activity occurring at the first electronic device.

* * * * *